US011014345B2

(12) United States Patent
Deiss

(10) Patent No.: US 11,014,345 B2
(45) Date of Patent: May 25, 2021

(54) METHOD FOR PRODUCING SEALING TAPE ROLLS

(71) Applicant: ISO-Chemie GmbH, Aalen (DE)

(72) Inventor: Martin Deiss, Abtsgmuend (DE)

(73) Assignee: ISO Chemie GmbH, Aalen (DE)

( * ) Notice: Subject to any disclaimer, the term of this patent is extended or adjusted under 35 U.S.C. 154(b) by 203 days.

(21) Appl. No.: 16/401,575

(22) Filed: May 2, 2019

(65) Prior Publication Data
US 2019/0337276 A1 Nov. 7, 2019

(30) Foreign Application Priority Data

May 7, 2018 (EP) .................................... 18170977

(51) Int. Cl.
*B32B 37/02* (2006.01)
*C09J 7/38* (2018.01)
(Continued)

(52) U.S. Cl.
CPC ............... *B32B 37/02* (2013.01); *B32B 5/18* (2013.01); *B32B 5/32* (2013.01); *B32B 7/12* (2013.01); *B32B 27/065* (2013.01); *B32B 27/34* (2013.01); *B32B 38/0004* (2013.01); *B32B 38/08* (2013.01); *C09J 7/205* (2018.01);
(Continued)

(58) Field of Classification Search
CPC .. B32B 37/02; B32B 5/18; B32B 5/32; B32B 7/12; B32B 27/065; B32B 27/34; B32B 38/0004; B32B 38/08; B32B 2260/046; B32B 2266/025; B32B 2266/0278; B32B 2307/7265; B32B 2405/00; C09J 7/38;
(Continued)

(56) References Cited

U.S. PATENT DOCUMENTS

| 10,286,624 | B2 * | 5/2019 | Deiss | ........................ E06B 1/62 |
| 10,569,497 | B2 * | 2/2020 | Deiss | ...................... B29C 53/04 |
| 2016/0060863 | A1 * | 3/2016 | Deiss | ........................ E06B 1/62 |
| | | | | 428/58 |

FOREIGN PATENT DOCUMENTS

DE        31 33271 A1    3/1983
DE    196 41 415 A1    4/1998
(Continued)

OTHER PUBLICATIONS

EP 18 17 0977 Search Report dated Nov. 5, 2018.
(Continued)

*Primary Examiner* — Jeffry H Aftergut
(74) *Attorney, Agent, or Firm* — Jansson Munger McKinley & Kirby Ltd.

(57) ABSTRACT

A method for producing sealing tape rolls of flexible, compressible foam having at least one external, radially oriented barrier layer comprises the steps of providing a foam web of flexible foam; forming a foam-barrier layer web by application of a barrier layer to a top surface and/or a bottom surface of the foam web; producing a plurality of sealing tape strips by introducing at least one continuous cut into the foam-barrier layer web in a longitudinal direction of the foam-barrier layer web and perpendicularly to the at least one barrier layer; and winding up each sealing tape strip of the plurality of sealing tape strips into a roll in such a way that the at least one barrier layer extends in the radial direction and is arranged on at least one of the two axial end surfaces of the roll.

25 Claims, 3 Drawing Sheets

(51) Int. Cl.
*C09J 7/20* (2018.01)
*C09J 7/26* (2018.01)
*B32B 5/18* (2006.01)
*B32B 5/32* (2006.01)
*B32B 7/12* (2006.01)
*B32B 27/06* (2006.01)
*B32B 27/34* (2006.01)
*B32B 38/00* (2006.01)
*B32B 38/08* (2006.01)
*E06B 1/64* (2006.01)
*E06B 1/62* (2006.01)

(52) U.S. Cl.
CPC . *C09J 7/26* (2018.01); *C09J 7/38* (2018.01); *E06B 1/64* (2013.01); *B32B 2260/046* (2013.01); *B32B 2266/025* (2013.01); *B32B 2266/0278* (2013.01); *B32B 2307/7265* (2013.01); *B32B 2405/00* (2013.01); *C09J 2400/243* (2013.01); *E06B 2001/628* (2013.01)

(58) Field of Classification Search
CPC ........ C09J 7/205; C09J 7/26; C09J 2400/243; C09J 2001/626; E04B 1/6812
See application file for complete search history.

(56) References Cited

FOREIGN PATENT DOCUMENTS

| | | |
|---|---|---|
| DE | 20 2010 008331 U1 | 11/2011 |
| DE | 10 2010 055 788 A1 | 6/2012 |
| DE | 20 2012 101 990 U1 | 10/2013 |
| DE | 20 2011 104 063 U1 | 1/2015 |
| DE | 10 2015 116 667 A1 | 4/2017 |
| EP | 1 936 246 A1 | 6/2008 |
| EP | 2 107 176 A1 | 10/2009 |
| EP | 2 620 565 A1 | 7/2013 |
| EP | 2 743 416 A2 | 6/2014 |
| EP | 2 990 552 A1 | 3/2016 |

OTHER PUBLICATIONS

EN ISO 12572, Water Vapor Transmission, dated Sep. 2001.
EN ISO 12572, Warm and Wet-Technical Behavior of Building Materials and Construction, Water Vapor Transmission, dated May 2017.

* cited by examiner

METHOD FOR PRODUCING SEALING TAPE ROLLS

FIELD OF THE INVENTION

The present invention relates to a method for producing sealing tape rolls of flexible, compressible foam with at least one external barrier layer.

BACKGROUND OF THE INVENTION

Sealing tapes are used to seal joints such as those between the frame profile of a window or door and the wall of a building for the purpose of sealing the joints against drafts and driving rain. In addition, the sealing tapes provide thermal insulation in the area of the joint which surrounds the frame profile. Additional films or layers, which are provided on a lateral surface of the frame profile, also increase the resistance of the sealing tape to the diffusion of water vapor. Films or layers of this type are therefore frequently called "barrier layers". For the sake of space-saving storage and ease of handling, such sealing tapes are compressed and rolled up into sealing tape rolls. They are unrolled and cut to the desired length only just before the sealing tape is installed on the frame profile.

It is at times very complicated to produce such sealing tapes or sealing tape rolls, because the barrier layer must be applied separately to each of the sealing tapes to be rolled up into a sealing tape roll.

Alternative sealing tapes are known in which at least one barrier layer is introduced into the interior of the sealing tape between two adjacent foam strips, so that the barrier layer is protected from damage. Introducing such a barrier layer is also quite complicated, however, and it is very difficult to control the application of the barrier layer to ensure its uniformity over the entire cross section of the sealing tape.

SUMMARY OF THE INVENTION

It is an object of the present invention to provide a method for the production of sealing tape rolls by which sealing tape rolls with at least one external barrier layer can be fabricated as easily and as cheaply as possible.

According to an aspect of the invention, the method for producing sealing tape rolls of flexible, compressible foam with at least one external, radially oriented barrier layer comprises the following steps, in the order specified:
   providing a foam web of flexible foam;
   forming a foam-barrier layer web by applying a barrier layer to the top surface and/or bottom surface of the foam web;
   producing a plurality of sealing tape strips by introducing at least one continuous cut into the foam-barrier layer web in a longitudinal direction of the foam-barrier layer web and perpendicularly to the at least one barrier layer; and
   winding up each sealing tape strip of the plurality of sealing tape strips into a roll in such a way that the at least one barrier layer extend in the radial direction and is arranged on one of the two axial ends surfaces of the roll.

Thus it is possible in a simple manner to produce a plurality of sealing tape rolls with at least one barrier layer. The barrier layer material and thus the barrier layer can be applied completely over the entire top and/or bottom surface of the foam web. The advantage of this is that the top and bottom surfaces of the foam web are readily accessible and visible, which means that the application of the barrier layer and the quality of the applied barrier layer can be effectively controlled. The barrier layer is preferably laminated onto the foam web. As a result of the uniform application of the barrier layer to the entire foam web, it is also guaranteed that the barrier layer will also be uniformly present even in the edge areas of the sealing tape strip to be produced subsequently. The method also offers the advantage that a plurality of sealing tape rolls can be produced simultaneously without much extra effort. The complicated application of individual barrier layers to individual sealing tape strips or the introduction of a barrier layer between adjacent foam strips is no longer necessary.

Sealing tape strips wound up into sealing tape rolls are also especially well-adapted to the space-saving storage and transport of the sealing tapes. The degree of compression is usually more than 25% based on the original thickness of the foam. In preferred embodiments, the sealing tape strips are wound up into rolls with a specified degree of compression of less than 25%, preferably of less than 20%, even more preferably of less than 15% based on the original foam thickness and/or with a compression of greater than 5% based on the original foam thickness.

The forming of the foam-barrier layer web preferably comprises the application of a barrier layer to the top surface and to the bottom surface of the foam web; and the winding-up of each sealing tape strip of the plurality of sealing tape strips into a roll is carried out in such a way that a barrier layer is arranged on each of the two axial end surfaces of the roll. Sealing tapes produced in this way comprise two opposing barrier layers, one of which, in the installed state, faces the interior of the room, whereas the other faces the exterior of the room. As a result, the sealing properties of the sealing tape, especially the resistance to vapor diffusion, can be adapted especially effectively to the given requirements. The two barrier layers can be formed out of the same material or of different barrier layer materials. In particular, the properties of the two barrier layers can be different; for example, their resistances to vapor diffusion can be different. After the installation of the sealing tape, a diffusion gradient between the interior of the room and the exterior of the room can thus be obtained.

The installed state of the sealing tape is defined as the state in which the sealing tape is arranged in the joint between the frame profile and the masonry. The longitudinal direction of the sealing tape extends in this case along the peripheral joint, and the sealing tape lies flat on the frame profile and on the masonry. A side surface of the sealing tape is then facing the interior of the room and the opposite side surface is facing the exterior of the room. At least one of these two side surfaces, i.e., the one facing the interior or the one facing the exterior of the room, comprises a barrier layer.

If a barrier layer is arranged on each of the two axial end surfaces of the roll, it is preferred that the method also comprise the cutting-through of the roll to form two sealing tape rolls by introducing a radial cut at a point located axially between the two end surfaces of the roll. This offers the advantage that two sealing tape rolls, each with an external barrier layer extending in the radial direction, can be formed from one sealing tape roll. As a result, the method for producing sealing tape rolls can be managed even more simply and more effectively.

According to another aspect of the invention, the method for producing sealing tape rolls of flexible, compressible foam with at least one external barrier layer extending in the radial direction comprises the following steps:

providing a plurality of foam webs of flexible foam;
forming a foam-barrier layer web by arranging a barrier layer in each case between a top surface of a foam web and a bottom surface of an adjacent foam web facing the top surface; bonding the plurality of foam webs to each other along facing top and bottom surfaces; and applying a barrier layer to at least one top or bottom surface, i.e., to a surface facing away from other foam webs, of at least one outermost foam web of the plurality of foam webs;
producing a plurality of sealing tape strips by introducing at least one continuous cut into the foam-barrier layer web in a longitudinal direction of the foam-barrier layer web and perpendicularly to the barrier layers; and
winding up each sealing tape strip of the plurality of sealing tape strips into a roll in such a way that the barrier layers extend in the radial direction and at least one barrier layer is arranged on one of the two axial end surfaces of the roll.

As a result, a plurality of sealing tape rolls with at least two barrier layers can be produced in an extremely simple manner. The barrier layer material and thus the barrier layers can be applied completely to the entire top and/or bottom surface of the foam webs. Because of the uniformity with which the barrier layers are applied to the entire foam webs, furthermore, it is also guaranteed that the barrier layers will also be formed uniformly even in the edge areas of the sealing tape strips produced subsequently. The method also offers the advantage that a plurality of sealing tape rolls can be produced simultaneously. There is no need for the complicated process of applying individual barrier layers to individual sealing tape strips or of introducing a barrier layer between adjacent foam strips. The introduction of a plurality of cuts into the foam-barrier layer web results in the formation of sealing tape strips comprising a plurality of barrier layers. At least one barrier layer is arranged inside the sealing tape strip without the need for the complicated process of introducing the barrier layer between two foam strips beforehand.

It is preferred that the forming of the foam-barrier layer web comprise the following steps:
(a) applying a barrier layer to at least a top surface or a bottom surface of a first foam web of the plurality of foam webs;
(b) arranging the first foam web and a second foam web of the plurality of foam webs on top of each other in such a way that the barrier-layer side of the top or bottom surface of the first foam web, at least one of which is provided with a barrier layer, is facing a bottom or top surface of the second foam web;
(c) bonding the first and second foam webs together; and
(d) applying a barrier layer to at least a top or bottom surface of the first or second foam web, i.e., a surface facing away from the other foam web, so that the foam-barrier layer web comprises a barrier layer on a top surface and/or a bottom surface.

A multi-ply foam-barrier layer web with any desired number of foam webs and barrier layers can be obtained if, between step (c) and step (d), the method comprises the addition of more foam webs by the application of, in each case, a barrier layer to at least the top or bottom surface of two adjacent foam webs, i.e., to the facing surfaces of those foam webs, and joining sets of two adjacent foam webs.

The application of a barrier layer according to step (a) and that according to step (d) are preferably conducted in a single step in order to obtain a method of the greatest possible efficiency. This can be done, for example, in that a barrier layer is applied to the bottom and top surfaces of a first foam web, one of which will then form an outwardly facing side of the foam-barrier layer web.

In one embodiment, the multi-layer foam-barrier layer web comprises a barrier layer on its top and bottom surfaces, and the method also comprises the cutting of the roll by introducing at least one radial cut at a point located axially between the two end surfaces of the roll. Thus, from a multi-ply sealing tape strip, it is possible to form two sealing tape rolls, each with an external barrier layer extending in the radial direction. The efficiency of the process is increased even more by this measure.

It is especially preferred that the at least one foam web and the foam-barrier layer web be moved in a conveying direction which is parallel to a longitudinal direction of the at least one foam web and of the foam-barrier layer web. The at least one foam web and the foam-barrier layer web are preferably moved continuously in the conveying direction. Alternatively, the at least one foam web and the foam-barrier layer web could also be moved in stepwise fashion in the conveying direction. Because of the movement of the at least one foam web and of the foam-barrier layer web, the result is achieved that these webs advantageously pass through individual processing stations, in each of which a method step is performed. In particular, it is possible that considerable lengths of the at least one foam web and of the at least one barrier layer can be provided on supply rolls and yet in a space-saving manner, as a result of which the productivity of the production process can be increased.

In one embodiment, at least one sealing tape strip of the plurality of sealing tape strips is rotated 90° or 270° around its longitudinal axis prior to the winding-up of the sealing tape strip. This achieves the result that the sealing tape strip has the correct arrangement for subsequent steps such as the winding-up into a roll.

It is also possible that, before the sealing tape strip is wound up into a roll, at least one sealing tape strip of the plurality of sealing tape strips is deflected in such a way that it extends at an angle to the conveying direction, preferably so that it is perpendicular to that direction. As a result, the winding-up of the at least one sealing tape strip takes place a certain distance away from the at least one other sealing tape strip without any interference of the one on the other. This offers advantages in particular with respect to the layout of a device for producing sealing tape rolls according to the invention, i.e., the device on which the tools for each method step are to be supported.

It is especially preferred that the method comprise the application of an adhesive strip to a side surface of each sealing tape strip of the plurality of sealing tape strips, so that the adhesive strip is arranged perpendicularly to the at least one barrier layer of the sealing tape strip. The adhesive strip is formed by, for example, a double-sided adhesive tape, one side of which is adhered to the sealing tape strip On the side facing away from the sealing tape strip, the adhesive strip can carry a cover strip such as a strip of silicone paper or similar material. The cover strip prevents the sealing tape strip from adhering to places where it is not wanted, such as the adjacent turns of a sealing tape roll. The adhesive strip serves to attach the sealing tape to the window or door frame in the installed state. For this purpose, the adhesive strip is always to be arranged on a side surface of the sealing tape strip which is perpendicular to the side surface which comprises the barrier layer. Before the sealing tape is applied to the window or door frame, the cover strip, if present, is to be removed. For the application of the adhesive strip to the sealing tape strip, it can be especially advantageous to rotate the sealing tape strip 90° or 270° around its longitudinal axis before the adhesive strip is applied.

The method also preferably comprises the impregnation of the at least one foam web prior to the application of the at least one barrier layer. The impregnation of the foam web comprises in turn the soaking of the foam web in an impregnation medium and the subsequent drying of the foam web. The properties of the foam can be influenced by the impregnation. In particular, the impregnation can delay the recovery of the foam after it has been compressed. Alternatively, it is possible to apply the at least one barrier layer first and then to impregnate the formed foam-barrier layer web. The impregnation of the foam web by itself, however, has the advantage that, at this time, there is no barrier layer to interfere with the penetration of the impregnation medium into the foam.

Finally, it is especially preferred that each barrier layer be formed by a film web, an adhesive tape, or an adhesive-like medium or a combination of these. The application of the barrier layer is preferably accomplished by laminating it to the foam web.

In the case of several foam webs, the barrier layer is advantageous in that it facilitates the bonding of two adjacent foam webs to each other. For example, two adjacent foam webs can be laminated together by the barrier layer. It is also conceivable, however, that the barrier layer could be bonded to the at least one adjacent foam web by an additional bonding agent; e.g., it could be bonded by an adhesive.

Each of the foam webs described here can be formed out of any desired open-cell or closed-cell flexible foam such as a foam of polyurethane or polyethylene and can be impregnated to ensure a delayed recovery after impregnation. The density of flexible foams of this type is in the range of 20-200 kg/m$^3$.

The flexible foam preferably comprises a compression hardness of more than 2 kPa. The compression hardness is preferably more than 2.1 kPa, even more preferably more than 2.2 kPa, and especially preferably more than 2.3 kPa. The compression hardness is preferably less than 4 kPa, preferably less than 3.8 kPa, and more preferably less than 3.6 kPa. The compression hardness is a measure of the strength of the foam. The values given here are based on a compression of 40% versus the original thickness. The compression hardness is determined according to DIN EN ISO 3386. The CV40 value is given.

The sealing tapes are preferably impregnated at least partially and preferably completely with an impregnation agent to delay their recovery. The impregnation agent preferably comprises an acrylate dispersion. In an advantageous embodiment, the acrylate dispersion comprises acrylate polymer particles dispersed in a homogeneous phase. It is especially preferable for the foam to be impregnated with a certain weight-percentage of acrylate dispersion for delayed recovery in such a way that, at 20° C. and 50% relative humidity, the sealing tape recovers to the point where it seals the joint in less than 24 hours from a sealing tape compression of about 9-13%.

Each foam web or the foam-barrier layer web preferably undergoes the step of the impregnation of the foam web with an aqueous polyacrylate dispersion and the step of a subsequent drying.

A foam or sealing tape strip which has been impregnated to delay its recovery preferably comprises an air permeability in the range of 50-1,000 l/(m$^2$s), more preferably in the range of 60-600 l/(m$^2$s), and especially preferably in the range of 80-400 l/(m$^2$s). The data on air permeability given within the scope of the present application are based on a determination according to DIN ISO 9237 under the standard conditions of a 10-mm-thick foam piece (completely relaxed) at a negative measurement pressure of 1.0 bar over a test surface of 100 cm$^2$ by the use of a Frank 21443 device.

Each of the barrier layers described here can be formed out of a film-like material such as a polyamide film or an adhesive such as a dispersion adhesive, in particular an acrylate adhesive.

In an especially preferred embodiment, each barrier layer is designed to be of the "humidity-variable" type. That is, its resistance to the diffusion of water vapor changes as a function of the humidity of the environment surrounding the barrier layer. Characteristic of the water vapor diffusion resistance is the water vapor diffusion value based on an air layer thickness in meters, the so-called sD value.

A barrier layer preferably comprises an sD value in the range of 0.05-100 m, more preferably in the range of 0.1-25 m or of 0.2-15 m (at 25% relative humidity (rH)). The sD value is measured according to DIN EN ISO 12572. Independently of this or in combination with it, the barrier layer can have an sD value in the range of 0.02-10 m or of 0.03-6 m or of 0.05-2 m at 72.5% rH according to DIN EN ISO 12572. For example, the sD value at 25% rH can be in the range of 1-10 m, and the sD value at 72.5% rH can be in the range of 0.1-5 m. Unless otherwise specified in DIN EN ISO 12572, the sD values are based on a temperature of 20° C.

The sD value of a barrier layer at 25% rH in the one case and at 72.5% rH in the other (at 20° C. in each case) preferably differs by a factor of ≥1.1-1.2, preferably of ≥1.5-2, possibly up to a factor of 3-5 or up to 10-20 or even up to 50 or up to 100 or 150 or beyond, as a result of which dependence of the water vapor diffusion of the barrier layer on the relative humidity is defined. The difference between the two sD values of the barrier layer at the two indicated relative humidities can be ≥0.25 m or ≥0.5 m or preferably ≥0.75-1 m; for example, it can be up to 5-10 m or up to 20-25 m or beyond. As a result, under different environmental conditions such as in summer or winter or in different climate zones, the dependence of the water vapor diffusion resistance is sufficient to achieve adequate adaptation of the water vapor diffusion resistance to the environmental conditions even at different relative humidities. The sD value at 25% rH is preferably higher in each case than the value at 72.5% rH.

The barrier layer preferably consists at least partially of a synthetic, water-swellable polymer.

A barrier layer has a thickness in the range between 1 μm and 1 mm, preferably a thickness in the range of 1-500 μm, or of 2-250 μm, especially preferably in the range of 5-100 μor of 5-50μ.

The barrier layer can also consist of multiple plies; in particular it can be configured as a multi-ply composite layer. At least one ply of at least one other material can be arranged on one or both sides of the functional layer in each case. The one or both additional plies, which cover the functional layer partially or completely, can protect and carry or support this layer and can also increase the stability of the barrier layer. The individual plies can consist of the same material or of different materials.

The plies arranged on one side or on both sides can in particular be nonwovens, fabrics, or meshes of inert materials such as polyethylene, polypropylene, polyester, glass fibers, or viscose, possibly even perforated films, especially those of polyethylene, polypropylene, or polyester. The plies can generally consist of any suitable material which is present in layer form and which preferably does not have an sD value higher than that of the functional layer. The plies arranged on one or both sides can consist of a dispersion adhesive, especially an acrylate adhesive.

The overall thickness of the layers of the barrier layer surrounding the functional layer can be, per side and independently of each other, in the range of 10-2,000 µm, preferably of 10-500 µm, especially of 10-250 µm, and especially preferably of 10-90 µm. Within the general scope of the invention, the barrier layer preferably forms a continuous, nonporous, unperforated layer. It is especially preferred that this layer be at least substantially impermeable to air. The air permeability of the barrier layer or barrier ply, as determined according to DIN EN ISO 9247 with a test surface of 100 cm$^2$ at a measurement pressure (negative pressure) of 1.0 mbar and with the use of a Frank 21443 device, can be ≤3-6 l/(m$^2$s) or preferably ≤1-2 l/(m$^2$s) or ≤0.2-0.5 l/(m$^2$s) or especially preferably ≤0.1-0.3 l/(m$^2$s), or it can be too small to measure.

DETAILED DESCRIPTION

Figure 1:
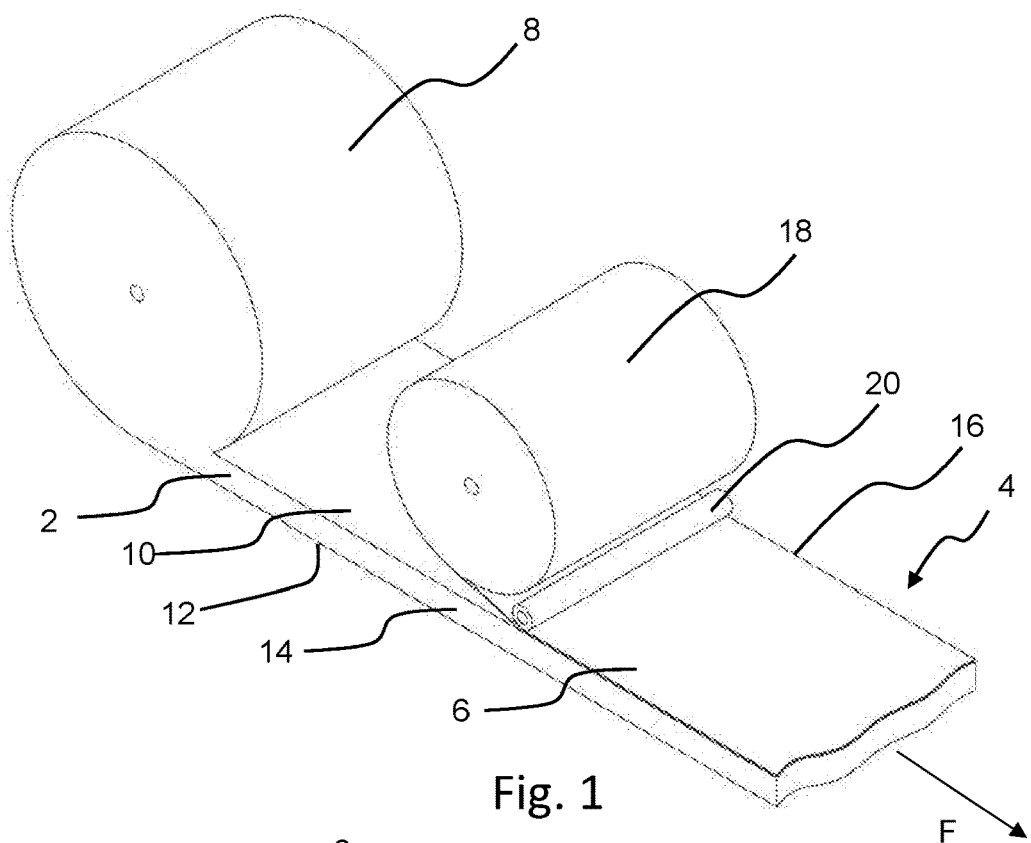
FIG. 1 is an isometric view of the application of a barrier layer to a foam web to form a foam-barrier layer web as part of an embodiment of the method according to the invention.

FIG. 1 shows by way of example the provision of a foam web 2 of flexible foam and the formation of a foam-barrier layer web 4 by the application of a barrier layer 6 to foam web 2 within the scope of a first embodiment of the method according to the invention.

Foam web 2 consists of a flexible foam, such as an open-cell flexible foam of polyurethane. Foam web 2 is preferably provided on a supply roll 8, onto which foam web 2 is wound in any desired length. Providing foam web 2 on supply roll 8 has the advantage that considerable lengths of foam web 2 can be provided without occupying a large amount of space and can be easily fed to the following processing step.

Foam web 2 wound up on supply roll 8 has a length in the range of 3-300 m, preferably of 10-200 m, and a width in the range of 0.03-3 m, preferably in the range of 0.1-1.5 m. The thickness of a foam web is preferably in the range between 5 mm and 30 cm, preferably between 1 cm and 12 cm.

Foam web 2 is unwound from supply roll 8 and then supplied to the following fabrication steps in a conveying direction F. In this situation, a longitudinal direction of foam web 2 is parallel to the conveying direction F. Foam web 2 has a top surface 10, a bottom surface 12, and side surfaces 14 and 16. Top surface 10 and bottom surface 12 are opposite each other and are connected to each other along the edges by a side surface 14, 16 in each case. The surface areas of top surface 10 and bottom surface 12 are much larger than those of side surfaces 14, 16. This means that the width and the length of foam web 2 are much larger in each case than the thickness of foam web 2. In the state in which foam web 2 is wound up on supply roll 8, top surface 10 or bottom surface 12 of foam web 2 forms the lateral surface of supply roll 8, whereas each of side surfaces 14, 16 forms an end surface of supply roll 8.

Downstream in conveying direction F from supply roll 8, barrier layer 6, which, in this embodiment is configured as a film, is applied to top surface 10 or to bottom surface 12 of foam web 2. In the embodiment shown here, barrier layer 6 is applied to top surface 10 of first foam web 2.

Barrier layer 6 is provided on supply roll 18. Barrier layer 6, and thus, also supply roll 18 preferably comprise substantially the same width as foam web 2. Providing barrier layer 6 on a supply roll 18 again offers the advantage that considerable lengths of barrier layer material can be provided in a space-saving manner and can be easily sent onward to the following steps of the production process. For this purpose, barrier layer 6 is preferably configured as a web or film.

Barrier layer 6 is preferably unwound from supply roll 18, fed to top surface 10 of first foam web 2, and bonded to that surface. For this purpose, it is possible to provide a roller 20, for example, around which the barrier layer 6 is at least partially wrapped, and which applies barrier layer 6 to top surface 10 of foam web 2. Barrier layer 6 is preferably laminated to the foam web 2 in the area of roller 20. The skilled person will be familiar with various ways in which a barrier layer can be applied to a foam web. For example, barrier layer 6 can be laminated to foam web 2 under the influence of pressure and heat. Barrier layer 6 can also be bonded to foam web 2 with an adhesive. For this purpose, barrier layer 6 can be provided with an adhesive on the side facing foam web 2, or it can itself have sufficient adhesive properties. For example, barrier layer 6 can be heated to convert barrier layer 6 to a state in which barrier layer 6 can bond to foam web 2. Alternatively, barrier layer 6 can be a tape or a film with adhesive properties of its own, which allow it to be applied to foam web 2. Under certain conditions, the adhesive side or sides of the barrier layer 6 can be provided with a peel-off film, which is removed before the barrier layer 6 is applied to the foam web.

In another alternative embodiment (not shown), barrier layer 6 is formed by an adhesive-like medium, which is applied to foam web 2. An adhesive-like liquid or viscous medium can be applied by appropriate tools such as applicator rollers, which are provided instead of roller 20 and which are supplied to foam web 2 from an appropriate adhesive storage unit. It is also conceivable that the adhesive-like liquid or viscous medium could serve as the bonding agent between the foam and a film-like barrier layer.

Because barrier layer 6 is applied to foam web 2 over a large surface area because this area is easily accessible, the reliability of the process can be increased, and the quality of the barrier layer and its bond to foam web 2 can be easily controlled.

Foam-barrier layer web 4 is formed by the application of barrier layer 6 to the foam web 2. Foam web 2 and barrier layer 6 are preferably bonded to each other continuously all the way along. Foam-barrier layer web 4 comprises at least foam web 2 and at least one barrier layer 6. In alternative embodiments, which will be described further below with reference to FIGS. 3-5, foam-barrier layer web 4 comprises a plurality of foam webs and a plurality of barrier layers. Foam-barrier layer web 4 is also moved in conveying direction F.

Figure 2:
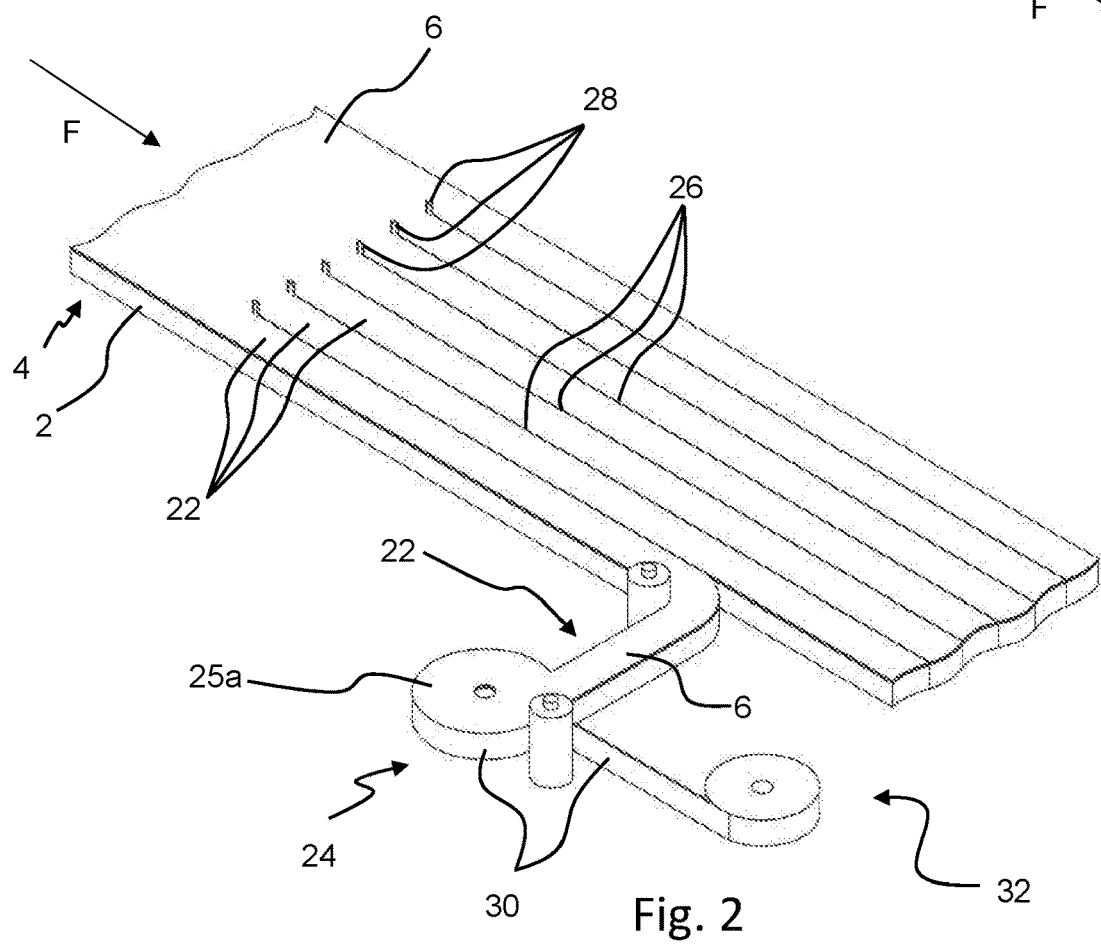
FIG. 2 is an isometric view of the introduction of continuous cuts into the foam-barrier layer web according to FIG. 1 and the winding-up of a sealing tape strip into a roll as part of an embodiment of the method according to the invention.

FIG. 2 shows the subsequent steps by which a plurality of sealing tape strips 22 is produced and by which a sealing tape strip 22 is wound up into a roll 24.

First, at least one continuous cut 26 is introduced into foam-barrier layer web 4 in a longitudinal direction of the foam-barrier layer web 4, i.e., in a direction which is parallel to conveying direction F and perpendicular to the at least one barrier layer 6. The at least one cut 26 penetrates foam-barrier layer web 4 all the way through. As a result, a plurality of sealing tape strips 22 is produced from foam-barrier layer web 4. The introduction of the at least one cut 26 can be accomplished by various methods, for example, a plurality of cutting tools 28 such as knives or saws. Alternative methods for introducing cuts into a foam-barrier layer web or for separating a foam-barrier layer web into sections are known to the skilled person.

Sealing tape strips 22 of the plurality of sealing tape strips 22 are preferably all of substantially the same width. In the embodiment shown here, cutting tools 28 are for this purpose arranged uniform distances apart across the width of foam-barrier layer web 4. The number of cutting tools 28 depends on the width of foam-barrier layer web 4 and on the desired thickness of sealing tape strips 22 to be produced. These dimensions can be adapted in any way desired. The width of sealing tape strip 22 is usually in the range of 1-10 cm, and preferably in the range of 2-8 cm. This width corresponds to the later thickness of the sealing tape in the completely expanded state.

To set up the production process so that it is as simple as possible, foam-barrier layer web 4 is moved along cutting tools 28 in conveying direction F. It is also possible, as an alternative, to introduce cutting tools 28 into a stationary foam-barrier layer web 4 and to move cutting tools 28 so as to form the at least one cut 26. It is obvious that foam-barrier layer web 4 and the at least one cutting tool 28 could also be moved in opposite directions.

The at least one cut 26 extends all the way through foam-barrier layer web 4, i.e., from bottom surface 12 of foam web 2 to top surface 10 of foam web 2 and also through barrier layer 6.

After the plurality of sealing tape strips 22 has been produced, each sealing tape strip 22 of the plurality of sealing tape strips 22 is wound up into a roll 24. FIG. 2 shows by way of example the winding-up of a sealing tape strip of the plurality of sealing tape strips 22. It is obvious that the other sealing tape strips 22 will also be wound up into rolls 24.

The winding-up of a sealing tape strip 22 into a roll 24 is carried out in such a way that the at least one barrier layer 6 extends in a radial direction and is arranged on one of the two axial end surfaces 25a of roll 24. This offers the advantage that barrier layer 6, in the installed state, will be facing the interior of the room or the exterior of the room, as can be seen in FIG. 6. Sealing tape strip 22 is preferably compressed as it is being wound up into roll 24, so that a compressed sealing tape strip 22 is wound up into a roll. In the embodiment shown, roll 24 is already in the form of a finished sealing tape roll.

An adhesive strip 30 is also usually applied to a side surface of each sealing tape strip 22 of the plurality of sealing tape strips 22, so that adhesive strip 30 is perpendicular to the at least one barrier layer 6 of sealing tape strip 22. As a result of the winding-up of the sealing tape strip into a roll, adhesive strip 30 becomes arranged on a side surface of roll 24. Adhesive strip 30 can be applied before or during the process of winding up sealing tape strip 22 into a roll. Adhesive strip 30 is preferably provided on an adhesive strip roll 32 and fed to a side surface of sealing tape strip 22. This step becomes especially simple if adhesive strip 30 is formed by a double-sided adhesive tape. Adhesive strip 30 can be covered on the surface not to be bonded to sealing tape strip 22 by a cover strip (not shown) of, for example, silicone paper, so that the individual turns of roll 24 will not stick to each other and the sealing tape can be easily unwound from roll 24.

So that access to the individual sealing tape strip 22 to be wound up can be improved, the strip is deflected before it is wound up into roll 24 in such a way that it is oriented at a certain angle to conveying direction F. In the embodiment shown, sealing tape strip 22 is deflected outward until it is substantially perpendicular to conveying direction F. In this case, the winding core of roll 24 is oriented vertically.

It is also conceivable, however, that sealing tape strip 22 could be deflected upward or downward (not shown). In that case, the winding core of roll 24 would be oriented horizontally.

For the purpose of winding up all sealing tape strips 22 of the plurality of sealing tape strips 22 into roll 24, it can also be advantageous for sealing tape strips 22 of the plurality of sealing tape strips 22 to be deflected in different directions. Alternatively, all of sealing strips 22 can be defected in the same direction, wherein the individual deflection points will then be arranged with an offset to each other in conveying direction F, so that individual sealing tape strips 22 not interfere with each other.

To ensure that barrier layer 6 is arranged on the axial end surface of roll 24, it can also be necessary to rotate sealing tape strip 22 of plurality of sealing tape strips 22 to be wound up, namely, to rotate it prior to the winding step by 90° or 270° or an odd multiple of 90° around its longitudinal axis. The rotation of sealing tape strip by 90° or 270° around its longitudinal axis can be done shortly before or after the deflection of the sealing tape strip at an angle to conveying direction F. The rotation of sealing tape strip 22 around its longitudinal axis by 90° or 270° has the effect that a side surface of sealing tape strip 22 to which adhesive strip 30 is to be applied is no longer arranged facing sideways but is rather is facing up or down. The feed of adhesive strip 30 and the of adhesive strip roll 32 will then be located in a plane above or below the plane of foam-barrier layer web 4.

Figure 3:
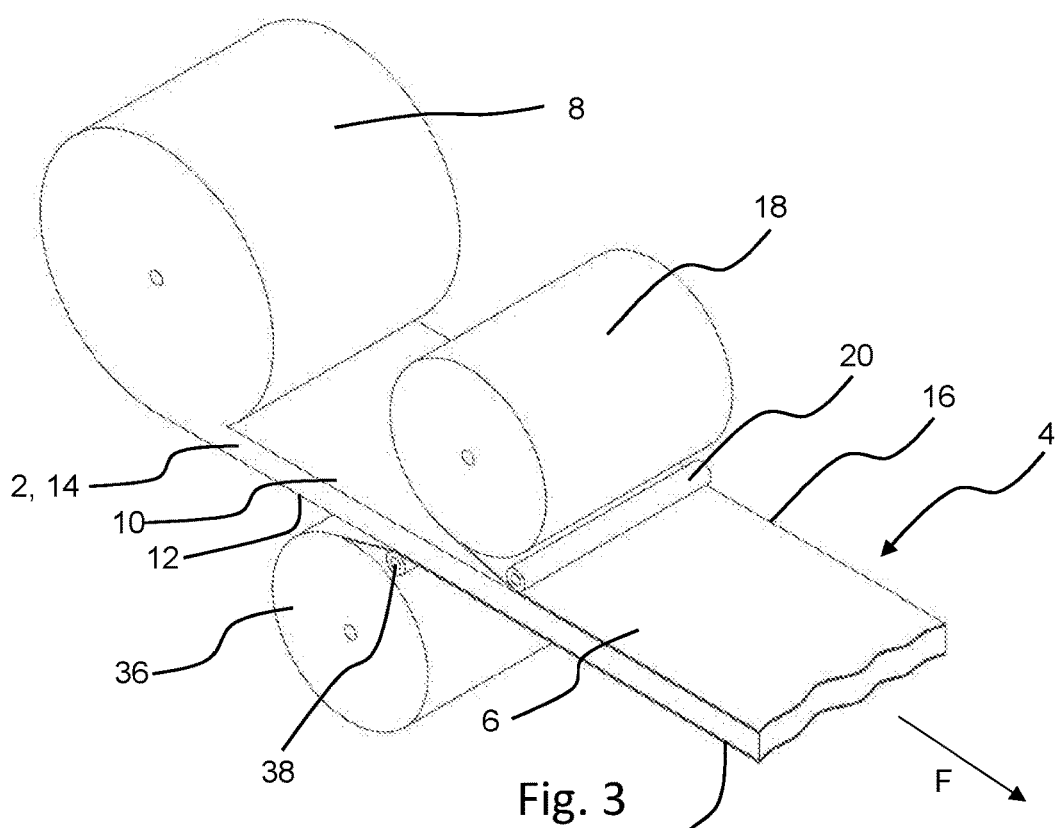
FIG. 3 is an isometric view of the application of a first barrier layer and a second barrier layer to a foam web to form a foam-barrier layer web as part of an alternative embodiment of the method according to the invention.

FIG. 3 shows how foam-barrier layer web 4 is formed within the scope of an alternative embodiment of the present invention. In this embodiment as well, foam web 2 is provided and barrier layer 6 is applied to top surface 10 of foam web 2 as described in connection with FIG. 1. In this respect, reference is herewith made to the entire description of FIG. 1, wherein all of the features also apply to this embodiment. In the following, it will be essentially the differences that will be discussed.

In the embodiment according to FIG. 3, the forming of foam-barrier layer web 4 comprises the application of first barrier layer 6 to top surface 10 of first foam web 2 and the application of second barrier layer 34 to bottom surface 12 of first foam web 2. Second barrier layer 34 is preferably provided on supply roll 36. Accordingly, supply roll 18 is arranged above the foam web 2, and supply roll 36 is arranged below foam web 2. The application of second barrier layer 34 to bottom surface 12 of foam web 2 is carried out in a manner corresponding to that in which first barrier layer 6 is applied to top surface 10 of foam web 2, as previously described. For this purpose, roller 38 can be provided, which feeds barrier layer 34 to bottom surface 12 of foam web 2.

Second barrier layer 34 is, in particular, in the form of a web or film. Second barrier layer 34 is unwound from supply roll 36, fed to bottom surface 12 of foam web 2, and bonded to it. Second barrier layer 34 is preferably laminated to foam web 2. As described above, second barrier layer 34 can also be laminated to foam web 2 under the influence of pressure and heat, or it can be bonded to it by an adhesive. For this purpose, second barrier layer 34 can be provided with an adhesive, or it can have sufficient adhesive properties of its own, or it can itself be an adhesive tape, which is applied to foam web 2. Alternatively, second barrier layer 34 is formed by an adhesive-like medium, which is spread over the surface of foam web 2.

First and second barrier layers 6, 34 can be formed of the same barrier layer material and have the same properties, especially with respect to their sealing effect. First and second barrier layers 6, 34, however, can also have different properties and/or be made of different barrier layer materials.

Foam-barrier layer web 4 formed according to FIG. 3, therefore, comprises a barrier layer 6 on top surface 10 and a barrier layer 34 on bottom surface 12 of foam web 2. This foam-barrier layer web 4 is also moved in conveying direction F.

Figure 4:
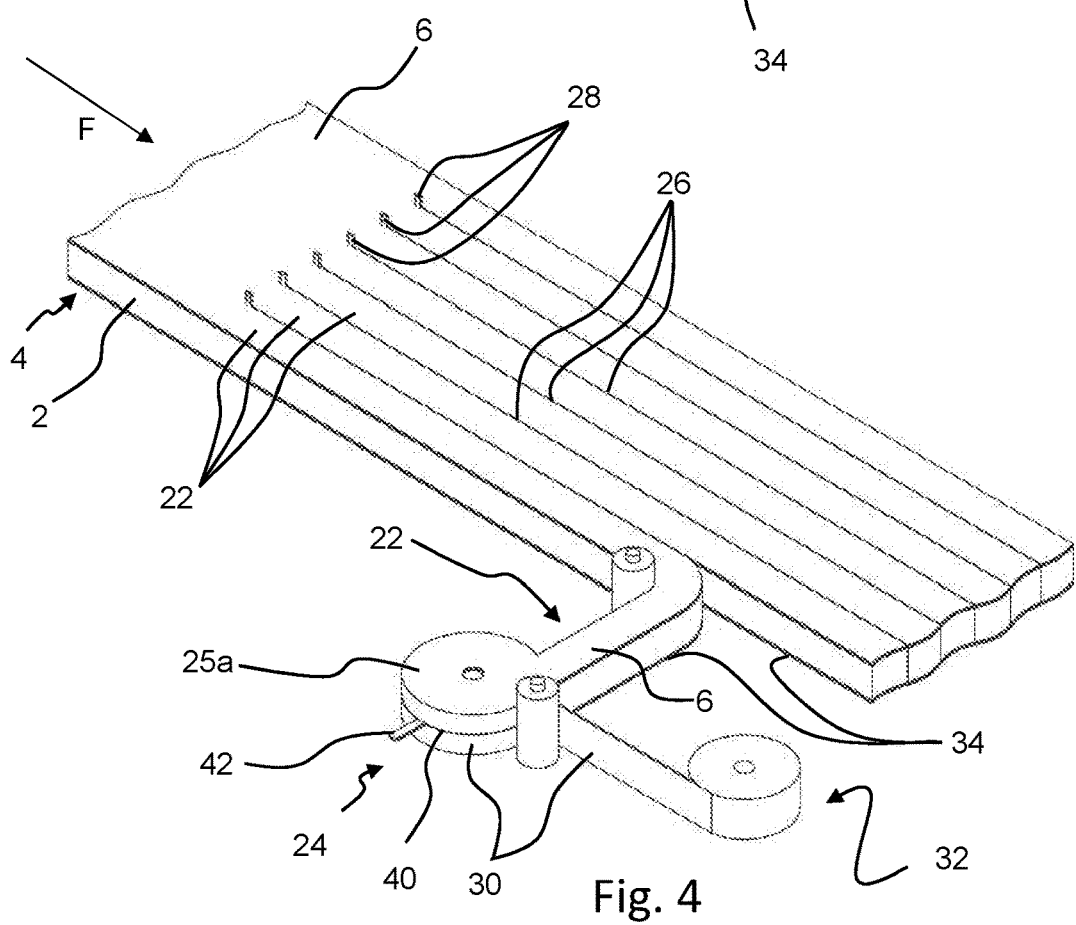
FIG. 4 shows the introduction of continuous cuts into the foam-barrier layer web according to FIG. 3 and the winding-up of a sealing tape strip into a roll and the cutting-through of the roll as part of an alternative embodiment of the method according to the invention.

FIG. 4 shows the introduction of continuous cuts 26 into foam-barrier layer web 4 according to FIG. 3 and by way of example the winding-up of a sealing tape strip 22 of the plurality of sealing tape strips 22 into a roll 24. It is obvious that the other sealing tape strips 22 will also be wound up into rolls 24.

The production of a plurality of sealing tape strips 22 by introducing at least one continuous cut 26 into foam-barrier layer web 4 in a longitudinal direction of foam-barrier layer web 4 perpendicularly to first and second barrier layer 6, 34 is carried out in substantially the same way as that described with reference to FIG. 2, for which reason reference is made here to that entire discussion of these points. It must be kept in mind, however, that the at least one continuous cut 26 passes completely through only first foam web 2 and two barrier layers 6, 34.

The winding-up of each sealing tape strip 22 of the plurality of sealing tape strips 22 into roll 24 is carried out in this case in such a way that first barrier layer 6 is arranged on one of two axial end surfaces 25a of roll 24 and second barrier layer 34 is arranged on the other axial end surface. If roll 24 represents the finished sealing tape roll, what is created in this way is a sealing tape roll with two external, radially oriented barrier layers 6, 34.

In addition, as shown in FIG. 4, roll 24 can be cut through at a point located axially between the two end surfaces 25a of roll 24 by the introduction of a radial cut 40. The skilled person is familiar with various ways in which cut 40 can be introduced. In particular, an additional cutting tool 42 in the form of a knife or a saw can be used, as shown.

It is thus possible to produce two sealing tape rolls from one sealing tape strip 22 without any additional process steps except for the provision of introducing the one cut 40 into roll 24. In particular, because of the way in which roll is cut, it is possible to produce a very clean and flat cut 40, which means that the axial end surface of the final sealing tape roll not provided with a barrier layer will have a perfect cut edge.

In analogy to the discussion above concerning FIG. 2, it is also possible in this embodiment to apply an adhesive strip 30 to a side surface of sealing tape strip 22, so that it is perpendicular to barrier layers 6, 34. The application of adhesive strip 30 can be carried out before or during the winding-up of sealing tape strip 22 into roll 24. This step becomes especially simple if adhesive strip 30 is again formed by a double-side adhesive tape, which is covered by a cover strip (not shown) on the side facing away from sealing tape strip 22.

As for the deflection of sealing tape strip 22 and its possible rotation, what was said above in regard to the embodiment of FIG. 2 applies here as well.

Figure 5:
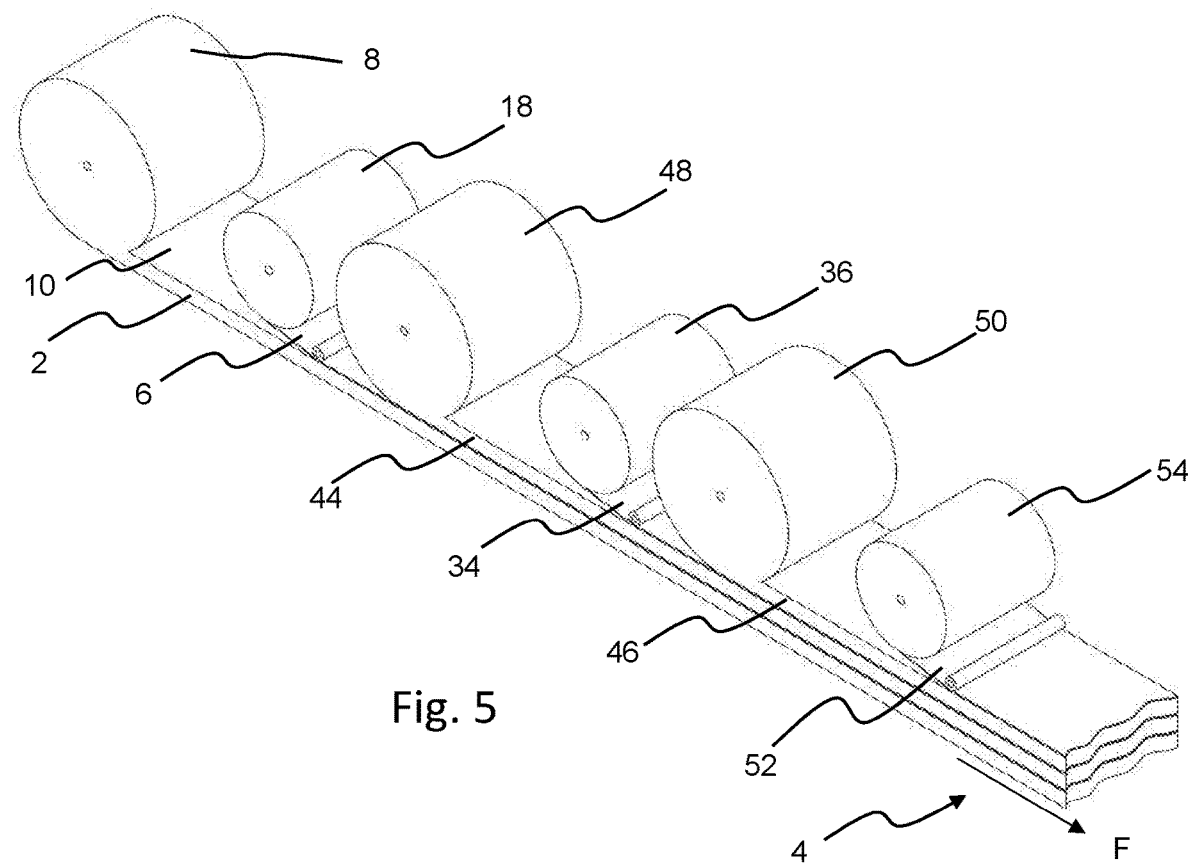
FIG. 5 is an isometric view of the formation of a multi-ply foam-barrier layer web consisting of a plurality of foam webs and a plurality of barrier layers as part of another alternative embodiment of the method according to the invention.

FIG. 5 shows how foam-barrier layer web 4 is formed within the scope of another alternative embodiment of the method according to the invention. A multi-ply foam-barrier layer web 4 is formed, which consists of a plurality of foam webs and a plurality of barrier layers, wherein each barrier layer is arranged between two adjacent foam webs. The provision of the individual foam webs and barrier layers and the application of the individual barrier layers to the individual foam webs can be carried out substantially in the same way as described above with reference to FIGS. 1-4.

First, a plurality of foam webs of flexible foam is provided. For example, a first foam web 2, a second foam web 44, and a third foam web 46 are provided. The number of foam webs can be selected as desired. Each of foam webs 2, 44, 46 is preferably provided on a supply roll. More precisely, first foam web 2 is provided on supply roll 8, second foam web 44 on supply roll 48, and third foam web 46 on supply roll 50. Foam webs 2, 44, 46 can be made of the same foam material or of different foam materials.

A plurality of barrier layers is also provided. In the embodiment shown here, three barrier layers are provided, each on its own supply roll. More precisely, first barrier layer 6 is provided on supply roll 18, second barrier layer 34 on supply roll 36, and third barrier layer 52 on supply roll 54. Barrier layers 6, 34, 52 can be made of the same barrier layer material or of different barrier layer materials. All of the foam webs 2, 44, 46 and all of the barrier layers 6, 34, 52, and the foam-barrier layer web 4 are preferably moved in the conveying direction F.

The multi-ply foam-barrier layer web 4 according to FIG. 5 is now formed in that, first, the plurality of foam webs 2, 44, 46 is arranged in such a way that a top surface of a foam web 2, 44, 46 faces a bottom surface of an adjacent foam web 2, 44, 46 in each case. In the embodiment shown here, top surface 10 of the first foam web faces the bottom surface of second foam web 44. The top surface of the second foam web 44 faces in turn the bottom surface of the third foam web 46. As a result, it becomes possible for the plurality of foam webs 2, 44, 46 to be laid against each by their flat surfaces. As many foam webs as desired can be arranged on top of each other in this way.

Forming foam-barrier layer web 4 also comprises the application of a barrier layer to at least the top surface of one of two adjacent foam webs or the bottom surface of the other foam web. In the embodiment shown, this means that, first, first barrier layer 6 is applied to top surface 10 of first foam web 2 or to the bottom surface of second foam web 44. Then the first and second foam webs 2, 44 are brought together. First and second foam webs 2, 44 are then arranged in such a way that the at least top or bottom surface of the foam web which is provided with first barrier layer 6 is facing the bottom or top surface of the other foam web. First and second foam webs 2, 44 accommodate first barrier layer 6 between them. Then first and second foam webs 2, 44 are bonded together, preferably by the first barrier layer 6 itself.

The application of the additional barrier layers and foam webs can be repeated as often as desired. For example, as shown in FIG. 5, second barrier layer 34 is applied to the top surface of second foam web 44 or to the bottom surface of third foam web 46, and second and third foam webs 44, 46 are then brought together, so that they accommodate second barrier layer 34 between them.

Finally, a barrier layer 52 is applied to at least a top or bottom surface of at least one outermost foam web 46 of the plurality of webs 2, 44, 46 facing away from the other foam webs 2, 44. As a result, a top and/or bottom surface of the overall foam-barrier layer web 4 acquires a barrier layer 52. According to FIG. 5, third barrier layer 52 is applied to the top surface of third foam web 46, which is facing away from the other foam webs 2, 44. In addition or alternatively to third barrier layer 52, a barrier layer can also be applied to the bottom surface of first foam web 2, which is facing away from the other foam webs 44, 46.

The plurality of foam webs 2, 44, 46 are bonded together along their facing top and bottom surfaces. This can be already done at the point when two foam webs are brought together with the barrier layer between them, especially when the barrier layer consists of, or comprises, an adhesive material.

It is also conceivable that the entire foam-barrier layer web 4 could be subjected to pressure and/or heat to bond the various layers together.

It is obvious that not all of the layers have to be applied one after the other to the top surface of first foam web 2. For example, a barrier layer can be applied to top surface 10, and a barrier layer can be applied to bottom surface 12 of first foam web 2, whereupon a foam web is applied to the top surface and another foam web is applied to the bottom surface of first foam web 2.

It is also possible that all of the foam webs could already have been provided with barrier layers, which means that the individual barrier layers can be applied even before the foam webs are provided.

Finally, it is also possible to introduce the barrier layer or each barrier layer into the intermediate space between the foam webs only when adjacent foam webs are brought together and simultaneously to bond the barrier layer to the foam webs.

It must always be kept in mind, however, that the entire foam-barrier layer web 4 ultimately comprises a barrier layer 52 on at least its top or bottom surface.

After that, a plurality of sealing tape strips 22 is formed from the multi-ply foam-barrier layer web 4 according to FIG. 5 by the introduction of at least one continuous cut into foam-barrier layer web 4 in a longitudinal direction of the web. As previously described, each sealing tape strip 22 of the plurality of sealing tape strips 22 is then wound up into roll 24 in such a way that barrier layers 6, 34, 52 extend in the radial direction and at least one barrier layer 6, 34, 52 is arranged on one of the two axial end surfaces 25*a* of roll 24 in question. If a barrier layer 6, 34, 52 is arranged on the top surface or bottom surface of multi-ply foam-barrier layer web 4 according to FIG. 5, the rolls thus obtained can be separated in analogy to the roll shown in FIG. 4 by making a cut at a point located axially between the two end surfaces 25*a* of the roll 24. In this way, two sealing tape rolls, each with an external barrier layer 6, 34, 52, is formed from one sealing tape strip 22.

As for the deflection of sealing tape strip 22 and its possible rotation, what was said above concerning the embodiment of FIG. 2 applies here as well.

When foam-barrier layer web 4 is formed, it is also conceivable that, in addition to the previously described possibilities, an adhesive layer could be applied to the foam web not provided with the barrier layer before the two foam webs are brought together. If desired, this adhesive layer can be covered by a peel-off film, which is removed before the foam webs are brought together.

By the embodiment according to FIG. 5, a sealing tape roll can be produced which comprises not only at least one external, radially oriented barrier layer but also at least one internal barrier layer.

Figure 6A:
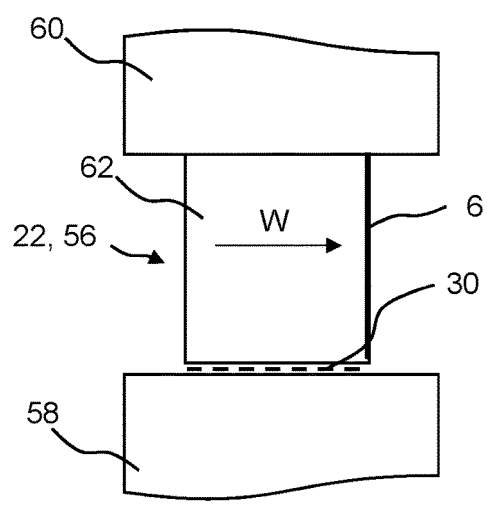
FIG. 6a shows a schematic, cross-sectional view of an installed state of one sealing tape produced according to one embodiment of the method according to the invention.
Figure 6B:
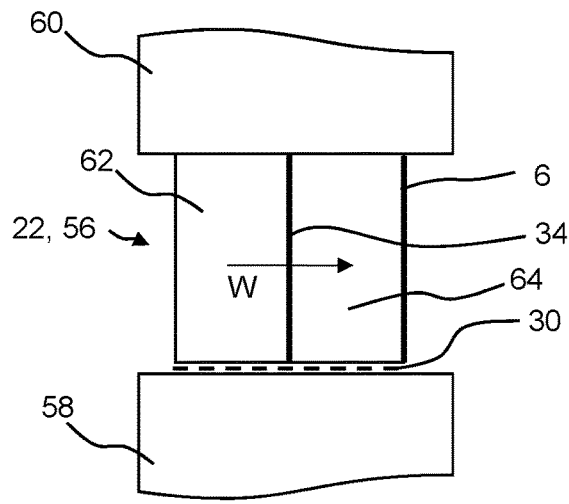
FIG. 6b shows a schematic, cross-sectional view of an installed state of an alternative sealing tape produced according to an alternative embodiment of the method according to the invention.

FIGS. 6*a* and 6*b*, finally, show an installation state of two embodiments of a sealing tape produced according to the invention. So that it can be installed, the sealing tape 56 must first be unwound from the sealing tape roll 24 and cut into strips of any desired length.

Sealing tape 56 therefore corresponds substantially to a previously formed sealing tape strip 22. The length of the strips of sealing tape 56 will usually be adapted to the external contours of the window frame or door frame to be sealed. Sealing tape 56 is then attached to window frame 58 or door frame by the double-sided adhesive tape functioning as adhesive strip 30 or by other adhesive layers, adhesive tapes, or other suitable alternatives. When a double-sided adhesive tape is used as the adhesive strip 30, therefore, it is necessary—before the sealing tape 56 can be attached directly to window frame 58—merely to remove the peel-off strip laminated to the double-sided adhesive tape facing away from sealing tape strip 22.

In the installation states illustrated in FIGS. 6*a* and 6*b*, sealing tape 56 is held between window frame 58 and masonry 60 in order to seal off the joint between them. The illustrated sealing tape 56 in this case comprises a foam strip 62 consisting of the foam web 2 provided with a barrier layer 6.

The sealing tape 56 is to be installed in such a way that at least one barrier layer 6 extends from the window frame 58 to the masonry 60 and thus, substantially at a right angle to a functional direction W of sealing tape 56. Functional direction W is parallel to the surfaces of window frame 58 and masonry 60 forming the joint to be sealed extending from the interior of the room (on the left in FIGS. 6*a* and 6*b*) to the exterior of the room (on the right in FIGS. 6*a* and 6*b*). In this way, a reliable seal against drafts and the diffusion of water vapor can be guaranteed. Barrier layer 6 is preferably arranged on the side of the sealing tape facing the interior of the room.

In the exemplary embodiment shown in FIG. 6*a*, precisely one foam strip 62 together with precisely one barrier layer 6 forms the foam-barrier layer web 4, which has been wound up into the sealing tape roll. There are many other possible ways of structuring a sealing tape produced according to the invention.

In the embodiment according to FIG. 6*b*, sealing tape 56 comprises a plurality of barrier layers 6, 34 and a plurality of foam strips 62, 64. First foam strip 62 is formed from foam web 2, and second foam strip 64 is formed from foam web 44. First and second barrier layers 6, 34 extend from window frame 58 to masonry 60 and thus, substantially at a right angle to functional direction W of sealing tape 56.

To provide for further adaptations of the sealing properties of sealing tape 56, the foam material of first foam strip 62 can be different from the foam material of the second foam strip 64. In addition, first foam strip 62 and second foam strip 64 can be impregnated with different impregnation agents, or only first foam strip 62 or only second foam strip 64 can be impregnated. In another exemplary embodiment, first foam strip 62 can have a color different from that of second foam strip 64. This makes it possible, for example, to characterize the preferred installation direction of sealing tape 56.

Barrier layer 6 situated externally on the sealing tape is preferably arranged on the side of the sealing tape facing the interior of the room.

Basically, any desired number of barrier layers 6, 34, 52 can be present in the sealing tape 56. Various widths and/or thicknesses of first foam strip 62 and/or various widths and/or thicknesses of second foam strip 64 are also conceivable, even within the same sealing tape 56.

It is obvious that the explanations given here of the individual foam webs and barrier layers, especially with respect to their formation, materials, properties, and bonding, apply to all of the foam webs and barrier layers of the embodiments described herein, and individual features of the various embodiments can be combined with each other in any way desired.

The invention claimed is:

1. A method for producing sealing tape rolls of flexible, compressible foam having at least one external, radially oriented barrier layer, the method comprising the following steps, in the order given:
   providing a foam web of flexible foam;
   forming a foam-barrier layer web by applying a barrier layer to at least one of a top surface and bottom surface of the foam web;
   producing a plurality of sealing tape strips by introducing at least one continuous cut into the foam-barrier layer web in a longitudinal direction of the foam-barrier layer web and perpendicularly to the at least one barrier layer; and
   winding up each sealing tape strip of the plurality of sealing tape strips into a roll in such a way that the at least one barrier layer extends in a radial direction and is arranged on one of two axial end surfaces of the roll.

2. The method according to claim 1 wherein the forming of the foam-barrier layer web comprises the steps of:
   applying a barrier layer to the top surface and the bottom surface of the foam web; and
   winding up each sealing tape strip of the plurality of sealing tape strips into a roll in such a way that one of the barrier layers is arranged on each of the two axial end surfaces of the roll.

3. The method according to claim 2 further comprising the step of cutting through the roll by introducing a radial cut at a point located axially between the two axial end surfaces of the roll.

4. The method of claim 1 wherein the foam web and the foam-barrier layer web are moved in a conveying direction, which is parallel to a longitudinal direction of the foam web and of the foam-barrier layer web.

5. The method of claim 1 wherein at least one sealing tape strip of the plurality of sealing tape strips is rotated by 90° or 270° around its longitudinal axis before the sealing tape strip is wound up.

6. The method of claim 4 wherein before the sealing tape strip is wound up, at least one sealing tape strip of the plurality of sealing tape strips is deflected in such a way that it extends at an angle to the conveying direction.

7. The method of claim 6 wherein before the sealing tape strip is wound up, at least one sealing tape strip of the plurality of sealing tape strips is deflected in such a way that it extends perpendicularly to the conveying direction.

8. The method of claim 1 further comprising the step of applying an adhesive strip to a side surface of each sealing tape strip of the plurality of sealing tape strips, so that the adhesive strip is arranged perpendicularly to the at least one barrier layer of the sealing tape strip.

9. The method of claim 1 further comprising the step of impregnating the foam web or foam webs prior to applying the at least one barrier layer.

10. The method of claim 1 wherein the at least one barrier layer is formed by film webs, adhesive tapes, adhesive-like media or combinations thereof.

11. The method of claim 1 wherein the foam web, which is wound up on a supply roll, has a length in the range of 3-300 m and a width in the range of 0.03-3 m.

12. The method of claim 1 wherein the at least one barrier layer has an sD value in the range of 0.05-100 m, measured according to DIN EN ISO 12572 at 25% relative humidity.

13. The method of claim 1 wherein a width of the at least one sealing tape strip of the plurality of sealing tape strips is in the range of 1-10 cm.

14. A method for producing sealing tape rolls of flexible, compressible foam having at least one external, radially oriented second barrier layer, the method comprising the steps of:
   providing a plurality of foam webs of flexible foam;
   forming a foam-barrier layer web by arranging at least one first barrier layer in each case between a top surface of each first foam web and a bottom surface of each adjacent second foam web facing the top surface of the first foam web; bonding the plurality of foam webs to each other along the facing top and bottom surfaces; and applying a second barrier layer to at least one of a top or bottom surface of at least one outermost foam web of the plurality of foam webs, which at least one of the top or bottom surface of the at least one outermost foam web faces away from the plurality of foam webs;
   producing a plurality of sealing tape strips by introducing at least one continuous cut into the foam-barrier layer web in a longitudinal direction of the foam-barrier layer web and perpendicularly to the first and second barrier layers; and
   winding up each sealing tape strip of the plurality of sealing tape strips into a roll in such a way that the first and second barrier layers extend in a radial direction and at least one second barrier layer is arranged on one of two axial end surfaces of the roll.

15. The method according to claim 14 wherein the forming of the foam-barrier layer web comprises the steps of:
   (a) applying a first barrier layer to at least one of a top surface or a bottom surface of at least one first foam web of the plurality of foam webs;
   (b) arranging each first foam web and second foam web of the plurality of foam webs on top of each other in such a way that the at least one barrier-layer covered top or bottom surface of the first foam web is facing a bottom or top surface of the second foam web;
   (c) bonding the first and second foam webs together to form a foam-barrier layer web; and (d) applying a second barrier layer to at least one of a top or bottom surface of the first or second foam web, which top or bottom surface faces away from the first and second foam webs, so that the foam-barrier layer web comprises a barrier layer on at least one of a top and bottom surface.

16. The method according to claim 15 wherein, between step (c) and step (d), the method comprises the steps of adding additional foam webs by applying in each case a barrier layer to at least the top surface or the facing bottom surface of two adjacent foam webs, and bonding the two adjacent foam webs together in each case, thus forming a multi-ply foam-barrier layer web.

17. The method according to claim 15 wherein applying a barrier layer according to step (a) and according to step (d) is conducted in a single step.

18. The method according to claim 14, wherein the foam-barrier layer web comprises a barrier layer on a top surface and a bottom surface thereof, and wherein the method also comprises the step of cutting through the roll by introducing at least one continuous radial cut at a point located axially between two axial end surfaces of the roll.

19. The method of claim 14 wherein the foam webs and the foam-barrier layer web are moved in a conveying direction, which is parallel to a longitudinal direction of the foam webs and of the foam-barrier layer web.

20. The method of claim 14 wherein at least one sealing tape strip of the plurality of sealing tape strips is rotated by 90° or 270° around its longitudinal axis before the sealing tape strip is wound up.

21. The method of claim 19 wherein before the sealing tape strip is wound up, at least one sealing tape strip of the plurality of sealing tape strips is deflected in such a way that it extends at an angle to the conveying direction.

22. The method of claim 21 wherein before the sealing tape strip is wound up, at least one sealing tape strip of the plurality of sealing tape strips is deflected in such a way that it extends perpendicularly to the conveying direction.

23. The method of claim 14 further comprising the step of applying an adhesive strip to a side surface of each sealing tape strip of the plurality of sealing tape strips, so that the adhesive strip is arranged perpendicularly to the at least one barrier layer of the sealing tape strip.

24. The method of claim 14 further comprising the step of impregnating the foam webs prior to applying the first and second barrier layers.

25. The method of claim 14 wherein the first and second barrier layers are formed by film webs, adhesive tapes, adhesive-like media or combinations thereof.

* * * * *